US 6,621,764 B1

(12) United States Patent
Smith

(10) Patent No.: US 6,621,764 B1
(45) Date of Patent: Sep. 16, 2003

(54) WEAPON LOCATION BY ACOUSTIC-OPTIC SENSOR FUSION

(76) Inventor: Thomas Smith, 91 Penny La., York, PA (US) 17402

( * ) Notice: Subject to any disclaimer, the term of this patent is extended or adjusted under 35 U.S.C. 154(b) by 15 days.

(21) Appl. No.: 09/789,070

(22) Filed: Feb. 20, 2001

Related U.S. Application Data

(63) Continuation-in-part of application No. 09/292,082, filed on Apr. 14, 1999, now Pat. No. 6,215,731, which is a continuation-in-part of application No. 08/834,754, filed on Apr. 30, 1997, now Pat. No. 5,970,024.

(51) Int. Cl.[7] .................................................. G01S 3/80
(52) U.S. Cl. ..................................................... 367/128
(58) Field of Search ........................ 367/128; 356/342, 356/139.04; 342/52, 53

(56) References Cited

U.S. PATENT DOCUMENTS 5,796,474 A * 8/1998 Squire et al. ............... 250/342
5,970,024 A * 10/1999 Smith ......................... 367/128
6,215,731 B1 * 4/2001 Smith ......................... 367/128

* cited by examiner

Primary Examiner—Daniel T. Pihulic

(57) ABSTRACT

An weapon localization system for determining the location of hostile weapon fire. In one embodiment, the weapon localization system includes acoustical detection means for detecting energy of a first frequency originating from said hostile weapon fire; and for transmitting a first set of data describing the location of said hostile weapon fire; optical detection means for detecting energy of a second frequency originating from said hostile weapon fire, and for transmitting a second set of data describing the location of said hostile weapon fire; and processing means coupled to said acoustical and said optical detection means for receiving said first and said second set of data and for determining whether said location of said first set of data match said location of second set of data and for generating a signal output if said match occurs.

28 Claims, 13 Drawing Sheets

WEAPON LOCATION BY ACOUSTIC-OPTIC SENSOR FUSION

This application is a CIP of 09/292,082, filed Apr. 14, 1999 now U.S. Pat. No. 6,215,731 which is a CIP of 08/834,754, filed Apr. 30, 1997 now U.S. Pat. No. 5,970,024.

1. Field of the Invention

The present invention relates to a system and method which combines various detection, location and tracking technologies in order to localize, calculate, determine, and/or track the source of hostile weapons fire such as that emanating from a sniper or an overhead "top-attack" weapon and to employ countermeasures adapted to protect a vehicle and/or personnel from this hostile weapons fire.

2. Background of the Invention

Previous weapon location systems (as used throughout this Application, the term "system" refers to a combination, in one embodiment, of hardware, software, and/or firmware which cooperates to perform one or more applications or functions) used either a purely or substantially singular acoustical detection apparatus or techniques or a purely or substantially singular optical detection apparatuses and/or techniques to locate the source of hostile weapon fire. Due to the problems and/or drawbacks associated with purely acoustical and purely optical detection techniques or substantially pure or singular technology techniques, the present invention combines the two concepts or technologies in order to utilize the advantages and substantially eliminate the disadvantages of each technology. Applicant has found that the combination of acoustical and optical as well as other detection and tracking mechanisms greatly enhances the overall detection capability of the system. Applicant believes that there was, prior to Applicant's, invention, no and/or substantially little or substantially no motivation to combine these techniques in the manner done by Applicant and which adequately achieved the results and/or goal of Applicant's invention.

Acoustical detection systems generally determine the direction and/or location of hostile weapon fire by measuring and/or calculating the various times of arrival of "sound" or acoustical energy generated by the hostile fire by the use of generally and equally spaced microphones formed or placed in a microphone array. Most prior acoustical hostile weapons fire detection and/or location systems are characterized by generally omnidirectional detection, only moderate accuracy and a substantially minimal false alarm rate. While such prior acoustical systems provide useful information for many applications, purely and/or substantially pure acoustical detection systems are not entirely appropriate for certain applications, such as applications involving the detection of the firing of supersonic and/or substantially supersonic projectiles, and the tracking of overhead "top attack" weapons. That is, supersonic projectiles arrive at the target prior to the arrival of the acoustical energy generated by the firing of these supersonic projectiles. Thus, an immediate counter-measure launch, necessary to destroy the incoming supersonic missiles, is generally not possible when a purely or singular acoustical system is used to detect the presence and/or location of such supersonic enemy fire. Additionally, it is well known that acoustical detection systems: can have a relatively large error in the determination of the location of the hostile weapon. In the past, this was not really a problem since offensive countermeasures which were used to destroy the hostile weapon usually comprised one or more missiles which destroyed a relatively large area. This wide area of destruction mostly and adequately compensated for the errant location data provided by the acoustical detection and/or location systems. However, war has changed. Oftentimes snipers, located within relatively densely populated areas are now encountered. Hence, large destructive countermeasures, necessary to compensate for errant location calculations, are generally not appropriate since they might hurt or kill many innocent people and destroy many valuable and historic buildings and/or other structures.

Optical detection systems generally determine the location and/or direction of hostile weapons fire by observing and/or sensing the position of the optical energy released or generated when a weapon is discharged. Most optical systems are characterized by relatively high accuracy, relatively high amounts or levels of false alarms and a rather limited field of view. Purely optical systems are also of rather limited value in some ambient light conditions where distinguishing the flash of a weapon from false flashes or other types of visible radiation is difficult. Purely optical systems are also of rather limited value where a weapon is obstructed or outside of the optical system's field of view. Hence, these prior optical detection systems were used only in very few specific applications, mainly due to their relatively high false alarm rate. Heretobefore, only one type of these systems was used to determine/calculate the location of adverse weaponry. No one, prior, to Applicant's discovery and/or invention, had realized the benefit of combining these two types of dissimilar systems in a manner which would overcome the drawbacks of each of these systems and provide a more robust system.

That is, Applicant was the first to realize that great accuracy and usefulness could be achieved by first using an acoustical system to determine the general location of the hostile weapons fire, a function that such prior acoustical systems performed relatively well, and then using an optical system or referring to or reviewing captured optical data in order to further refine the location within the field established by the acoustical system. In this manner, the relatively notorious "false alarms" associated with the optical systems could be minimized since only the optical data which emanates and/or is generated from the field of view formed or "fixed" by the acoustical technique would be reviewed. Moreover, the concomitant use of optical system data could allow even supersonic projectiles to be detected. This new combined system thus allows great accuracy which is necessary when detecting hostile weapons fire in cities and other areas in which greatly destructive missile counteroffensive apparatuses cannot be used.

Importantly, Applicant has discovered that the present invention is especially useful in detecting, tracking and countering attacks from overhead or "top attack" weapons. It is known that armored military vehicles generally have their strongest armor (greatest thickness) on their respective sides, and on their respective front and back surfaces. The armor covering the top and the bottom of armored vehicles is generally somewhat thinner, less protective, and generally more susceptible to penetration than the armor on the sides of such vehicles. As a result, armored vehicles are generally known and/or thought to be more difficult to attack using weapons that have horizontal trajectories, and are more vulnerable to weapons following and/or exhibiting steep travel trajectories and weapons which may be launched or fired from directly above these vehicles. Until relatively recently, the "threat" weapons or the weapons used to attack armored vehicles have been almost exclusively horizontal trajectory weapons.

However, to exploit the higher vulnerability of the "topside" armor of military armored mobile vehicles, new weapons have been developed. Generally, these weapons can direct shaped charges and launch projectiles towards armored vehicles from a location directly above the vehicle.

A diagram of the travelling and/or firing trajectory or path 102 of one such weapon and the significant events of its arming sequence is shown in FIG. 12. As illustrated in FIG. 12, the overhead weapon 120 comprises a delivery device 100, typically a 155 mm artillery projectile, which is initially launched and carries or "delivers" the overhead or "top attack" weapon portion 104 to a point approximately 1200 meters or more above the target vehicle 118. At this point, top attack weapon portion 104 generally comprising a "package" containing two submunition "packages" 106, 108 is expelled from the delivery projectile 100 by a small explosive charge (i.e., "the main event"). This is followed almost immediately by a first "band cutter" event where a small explosive (not shown) cuts a steel band 109 usually connecting packages 106, 108, effective to separate the two submunition packages 106, 108. Each package relatively immediately deploys a parachute-like fabric decelerator 110 (e.g., a "Rapid Air Inflatable Decelerator" ("RAID")), to slow the horizontal speed of each submunition 106, 108 from the horizontal launch speed of approximately mach 1 to essentially zero. This causes each submunition 106, 108 to fall along a vertical trajectory. After each of the two submunitions 106, 108 has slowed to a vertical trajectory, a small explosive charge in each submunition (not shown) performs a second band cutter task that is effective to cause the deployment of a second parachute-like device 112 (e.g., a Vortex Ring Parachute ("VRP")), from each submunition package. The VRP provides the platform for vehicle target acquisition and attack by the submunition. At this point, each submunition will scan for a target (i.e., an armored vehicle 118) in a predetermined area below the submunition using heat sensing, image recognition or another suitable technology. Upon locating a viable target, each submunition 106, 108 will fire a projectile or explosive device (not shown) upon the target. The entire top attack sequence from "the main event" to the firing by submunitions 106, 108 may take as long as 30 to 45 seconds.

Each of the afore-described events (i.e., the main event, the first band cutter event, and the second band cutter event) generates an acoustical event. The main event will also typically generate an optical flash that is visible in the mid-wave IR band. Various falling objects have also been observed with a mid-wave IR camera. The sensor fusion system of the present invention generally allows for generally reliable detection, tracking and countermeasure accuracy and results of such top-attack weapons which emit various acoustical and optical signals.

There is therefore a need for, and it is a principal object of this invention to provide, a weapon and/or hostile weapons firing location and localization system which overcomes the aforementioned drawbacks of the prior substantially purely acoustical and substantially purely optical detection systems and which, in fact, combines the advantages and the techniques of the two systems to achieve a system characterized by general omnidirectional detection, a relatively low false alarm rate, relatively high accuracy and relatively immediate counter-measure capability. In essence, Applicant has discovered that, one may utilize the accuracy of infrared systems in combination with "gross" type location data specified by the acoustical systems to provide a very desirable "fused" system. Applicant has further discovered that such a combination of systems can be further improved by using various tracking technologies which will allow a target to detect an overhead attack, take defensive action and direct a countermeasure. As used in this Application, the terms "location" and "localization" each mean the location of an entity (e.g. hostile weapons fire) as well as the processes to locate the firing entity. Thus, these words may be used interchangeably.

SUMMARY OF THE INVENTION

According to a first aspect of the present invention, a weapon location and/or detection system is provided which combines an acoustical detection system and an optical detection system to utilize the advantages and substantially reduce and/or eliminate the disadvantages of each technology.

According to a second aspect of the present invention, a weapon location and/or detection system is provided which is designed to determine the location of hostile weapon fire and which generally has omnidirectional detection capability, a relatively low false alarm rate, relatively high accuracy and relatively immediate counter-measure capability.

According to a third aspect of the present invention, a weapon location, detection and tracking system is provided which is designed to detect an overhead attack, take defensive action and direct a countermeasure.

In one embodiment of the present invention, a weapon location and/or detection system adapted to determine the location of hostile weapon fire is provided. The system comprises acoustical detection means for detecting energy of a first frequency originating from the firing of the hostile weapon, and for creating and transmitting a first set of data describing the location of the hostile weapon; optical detection means for detecting energy of a second frequency originating from the firing of the hostile weapon, and for creating and transmitting a second set of data describing the location of the hostile weapon; and processing means communicatively coupled to the acoustical and the optical detection means, for receiving the first and the second set of data and for comparing the first and second sets of data and for generating a signal output if the comparison yields and/or results in a match.

In another embodiment of the present invention a weapon location system adapted to determine the location of hostile weapon fire is provided. In this alternate embodiment the system comprises acoustical detection means for detecting energy of a first frequency originating from hostile weapon fire and for transmitting a first set of data describing the location of said hostile weapon fire; laser detection means communicatively coupled to the acoustical detection means for receiving the first set of data, for scanning the location described by the first set of data, for detecting particles associated with discharge of said hostile weapon fire, and for transmitting a second set of data describing the location of said particles; and processing means communicatively coupled to the acoustical and the optical detection means, for receiving said first and said second set of data, and for determining whether the location of the first set of data match or correspond to the location of the second set of data and for generating a signal output if a match and/or correspondence occurs.

According to yet another embodiment of the invention a methodology for determining the location of hostile weapons fire is provided. In a first aspect of this methodology embodiment, the method comprises the steps of sensing acoustical energy associated and/or generated from the hostile weapons fire; sensing optical energy associated and/or generated from the hostile weapons fire; calculating a first location using only the sensed acoustical energy; calculating a second location using only the sensed optical energy; comparing the first and second locations; and providing an output signal if the first location is substantially similar to the second location.

Further objects, features, and advantages of the present invention will become apparent from any consideration of the following description and the appended claims, when taken in conjunction with the accompanying drawings.

BRIEF DESCRIPTION OF THE DRAWINGS

For a fuller and more complete understanding of the nature and objects of the present invention, reference should be had to the following drawings in which.

DETAILED DESCRIPTION OF THE INVENTION

Figure 1:
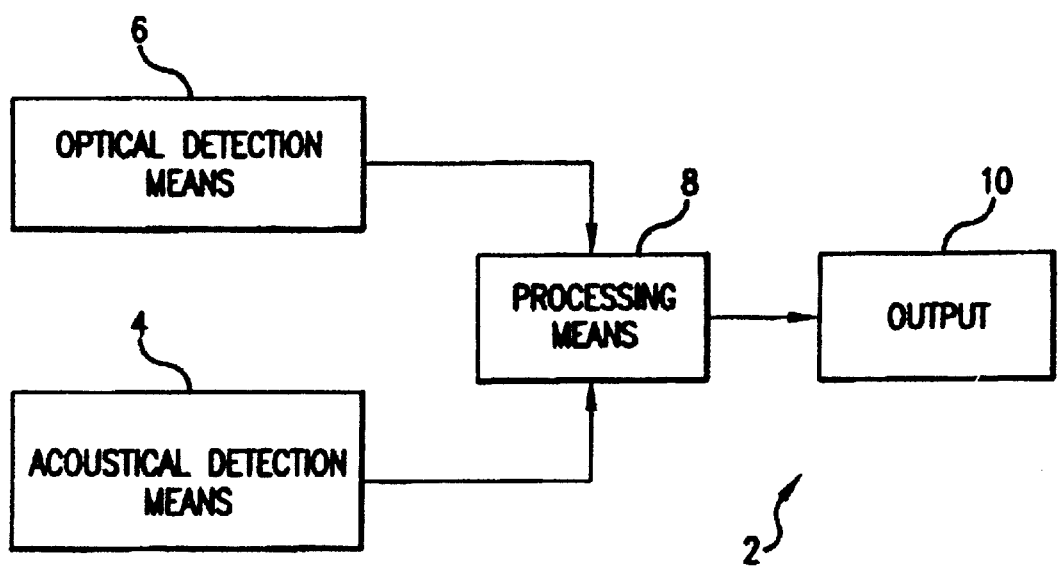
FIG. 1 is a block diagram of the preferred embodiment of the present invention.

Referring now to FIG. 1, there is shown a block diagram of a weapon and/or hostile fire location and/or detection system 2 which is made in accordance with the preferred embodiment of this invention. As shown, weapon location/detection system 2 includes an acoustical detection means 4, an optical detection means 6, a processing means 8, and an output providing means 10.

According to one aspect of the system 2, acoustical detection means 4 comprises, for example and without limitation, those acoustical systems, devices, and/or apparatuses which are more fully described in U.S. Pat. No. 5,258,962 entitled "Acoustic Projectile Trajectory Evaluation Device", invented by Lasse Karlsen; U.S. Pat. No. 4,350,881, entitled "Projectile Position Detection Apparatus", and invented by Knight et al.; and U.S. Pat. No. 4,885,725, entitled "Position Measuring Apparatus and Method", and invented by McCarthy et al. Each of these United States Patents is hereby fully and completely incorporated by reference as if fully and completely set forth herein, word for word and paragraph by paragraph.

Figure 3:
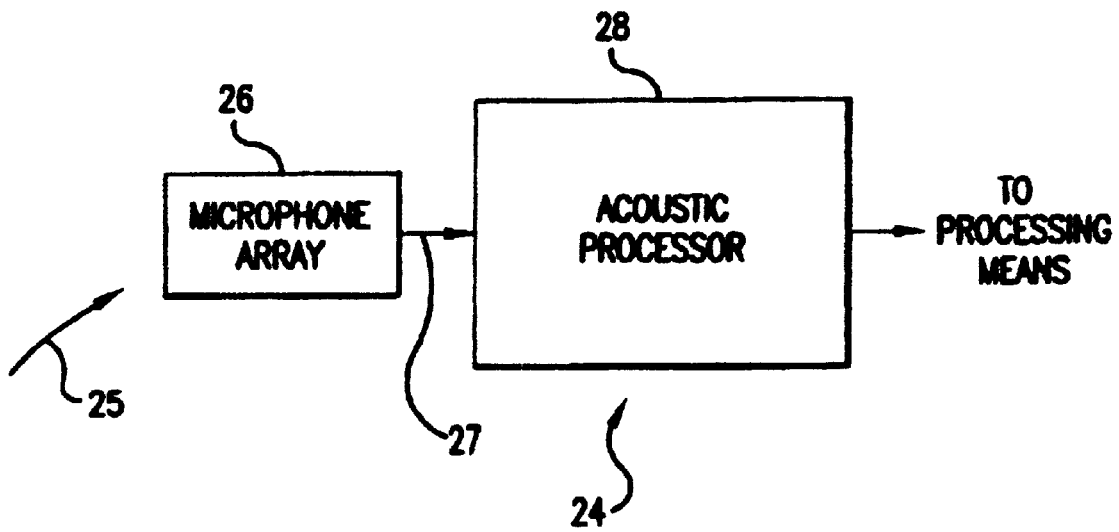
FIG. 3 is a block diagram of an acoustical detection means used in the preferred embodiment of the present invention.
Figure 4:
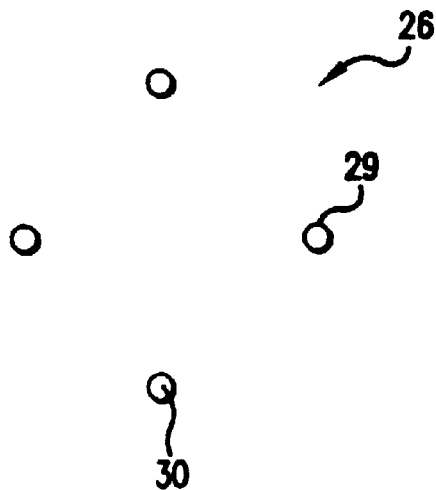
FIG. 4 is a top view of a microphone array which may be used in the present invention.

FIG. 3 illustrates one exemplary type of acoustical detection system 24 which may be used in and by the invention. As shown, acoustical detection system 24 comprises and/or includes a microphone array 26 (pictured alone in FIG. 4) and an acoustical processor 28. Each of the microphones arranged within microphone array 26 operates and is adapted to receive incoming acoustical energy 25 of a first acoustical or "sound" frequency (most probably in the range of about 300 hz to about 15,000 hz) originating and/or associated with the firing of a hostile weapon, and to transmit a separate signal 27 from each microphone 29 in microphone array 26 to an acoustical processor 28. Acoustical processor 28, in the preferred embodiment of the invention comprises, a microprocessor operating under stored program control and associated operating hardware and software. Such microprocessor assembly arrangements are described more fully in the textbook entitled "Computer Architecture and Organization" which was authored by John P. Hayes, published by the. McGraw-Hill book company and having a library reference identification of I5BN 0-67-027363-4 and which is fully and completely incorporated herein by reference, word for word, and paragraph for paragraph. Specifically processor assembly 28 determines and/or calculates the location of the source of the acoustical energy (e.g. the location of the weapon whose firing generated the energy) and creates and transmits location data describing the hostile weaponry location to processing means 8 by use, in one embodiment, of algorithms and other known mathematical operations described more fully in the previously incorporated United States Patents and which are known to those skilled in this art.

Acoustical detection system 24, and more particularly processor or processor means 28, in the preferred embodiment of the invention, determines values such as time of energy arrival, azimuth, elevation/depression angle, and trajectory of the incoming acoustical energy. The acoustical detection system 24 may also employ a filter (not shown) to distinguish and/or "block out" some of the various acoustical energies received by microphone array 26 in order not to have processor 28 errantly process non-weapons firing noises. That is, for example and in one embodiment, the filter will allow only those frequencies associated with a specific type of hostile weapons fire to reach the array 26. Similarly, acoustical energy characteristics will vary with each type of employed hostile weapon. Hence, filter design characteristics in acoustical detection system 24 will be varied to optimize detection. Particularly, the filters will be designed/selected in order to allow only the energies of the known hostile weapons systems to be coupled to processor 28. The precise operation and calculations of acoustical detection system 24 is more fully described and illustrated by the inventor in the aforementioned fully incorporated patent references. It is important to note that the invention is not limited to use with the exact acoustical detection systems described, in these previously incorporated references. Applicant realizes that a number of other acoustical detection systems can and should be used that would produce substantially similar or even superior results and would not depart from the spirit and scope of the invention and the inclusion and/or use of these previously described/ incorporated acoustical system embodiments in Applicant's invention should not be construed so as to limit the nature of the described invention or in any manner affect the scope of the subjoined claims. For example and without limitation, the acoustical detection system 24 for this invention could use a three microphone array, a tetrahedral array, or another array forming a three dimensional solid. Such designs will provide direction similarly precise detection and estimation and would require only appropriate revisions to the signal processing algorithms employed by acoustical detection system 24.

Optical detection means 6 used in the preferred embodiment of this invention may comprise a conventional and commercially available optical detection system, examples of which are more fully described in U.S. Pat. No. 3,944,167 entitled "Radiation Detection Apparatus" and invented by Figler et al.; and U.S. Pat. No. 3,848,129 entitled "Spectral Discriminating Radiation Detection Apparatus" and invented by, Figler et al. Each of these United States Patent references are fully and completely incorporated herein by reference as if fully and completely set forth herein, word for word and paragraph by paragraph. One example of a suitable optical detection system is the commercially available model IRC-160ST Staring-Mid Wavelength Infrared Camera, manufactured and sold by Cincinnati Electronics (Cincinnati, Ohio).

Figure 5:
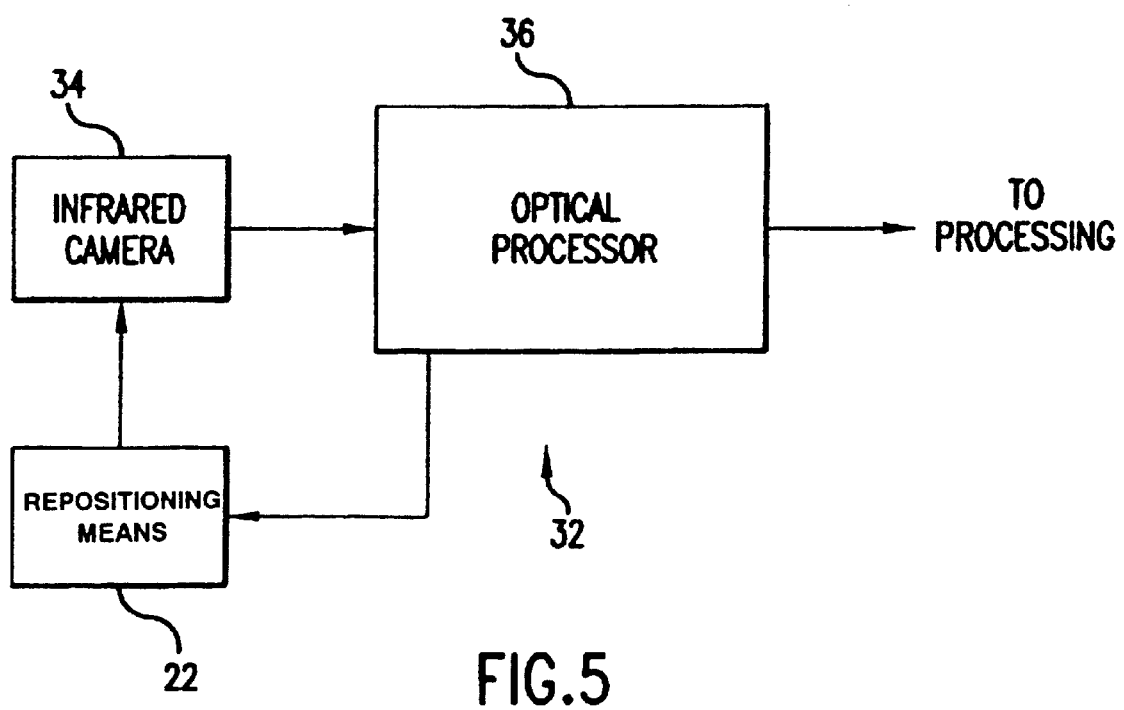
FIG. 5 is a block diagram of an optical detection means used in the preferred embodiment of the invention.

As shown in FIG. 5, the optical detection system 32 used in the preferred embodiment of the present invention (corresponding in one embodiment to optical detection means 6) comprises an infrared camera 34 and an optical processor assembly 36 which, in one embodiment of the invention, comprises a microprocessor assembly operating under stored program control. Such an assembly may be substantially similar to the previously described assembly 28 and described in the previously incorporated Hayes textbook reference.

Infrared camera 34 operates and/or functions to receive incoming energy of a second or "infrared" or visual type of frequency originating from and/or associated with hostile weapon fire and upon receiving and/or sensing this incoming energy transmits a signal to an optical processor 36. Optical processor 36 determines the location of the source of the hostile weapon fire and creates and/or transmits data describing the calculated/determined location to processing means 8. Such calculations and/or determination are made by use of, in one embodiment, algorithms and mathematical analyses which are more fully described in the United States Patent references which are fully incorporated herein by reference and which are known to those skilled in this art.

Figure 17:
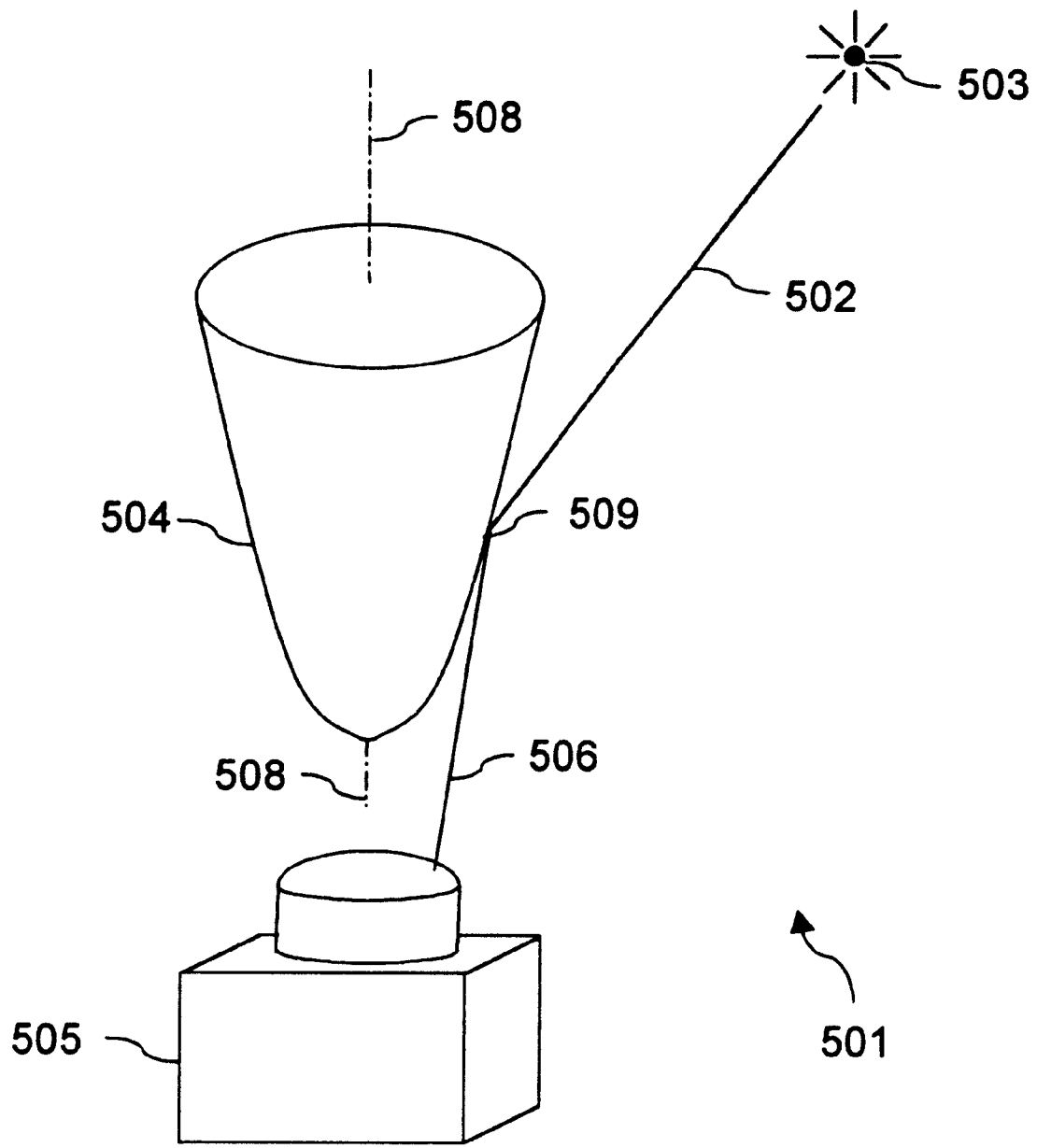
FIG. 17 is a diagram of a top attack detection and tracking system.

Weapon location/detection system 2 may also function and/or operate with a camera assembly 501 (pictured alone in FIG. 17) replacing singular and/or substantially singular infrared camera 34. Camera assembly 501 comprises optical reflector surface 504 and camera 505. Reflector surface 504 is specular and in the preferred embodiment has the shape of a figure of revolution about its vertical axis of revolution 508 thereby allowing it to receive optical energy from any azimuth and reflect this optical energy downwards to camera 506. Camera 505 operates and/or functions to receive incoming optical energy that is generated by hostile weapon fire of an "infrared" and/or visual type of frequency and is reflected from reflector surface 504. Other shapes for reflector surface 509 are possible within the spirit of this invention.

Optical energy source 503 emits optical energy 502 that strikes reflector surface 504 at principal reflection point 509 where optical energy 502 is diverted to camera 505 that senses reflected optical energy 506 received from principal reflection point 509 on reflector surface 504. Camera 505 upon receiving and/or sensing this incoming optical energy transmits a signal to optical processor 36 that determines the location of principal reflection point 509 and then calculates direction from reflection point 509 to optical energy source 503 by using a microprocessor which may substantially correspond to the previously described microprocessor assembly 36 acting under stored program control that follows an established mathematical relationship understood by one with ordinary skills in the art.

In such a case repositioning means. 22 is not included in weapon localization system 2, nor is it required, since camera assembly 501 covers all possible fields of view. Other then the absence of repositioning means 22 weapon localization system 2 with camera array 501 operates in substantially the same manner as previously described.

Particularly, as more fully described in these prior incorporated references, optical detection system 32 will determine values such as azimuth, time of occurrence and elevation/depression angle of the incoming energy. The precise operation and calculations of optical detection system 32, are more fully described in the aforementioned fully incorporated references. The invention is not limited to use with the aforementioned optical detection system. Certain design details will vary depending upon the class of hostile weapons to be detected and localized. For example, and without limitation, certain weapons such as antitank missiles may have a stronger signature in one of the infrared, visible or ultraviolet bands. The camera employed in weapon localization system 2 will correspond to the frequency of the desired weapon. Furthermore, Applicant realizes, as should one of ordinary skill in the art, that a number of other optical detection systems can be used that would produce substantially similar results and not depart from the spirit of the invention.

Figure 2:
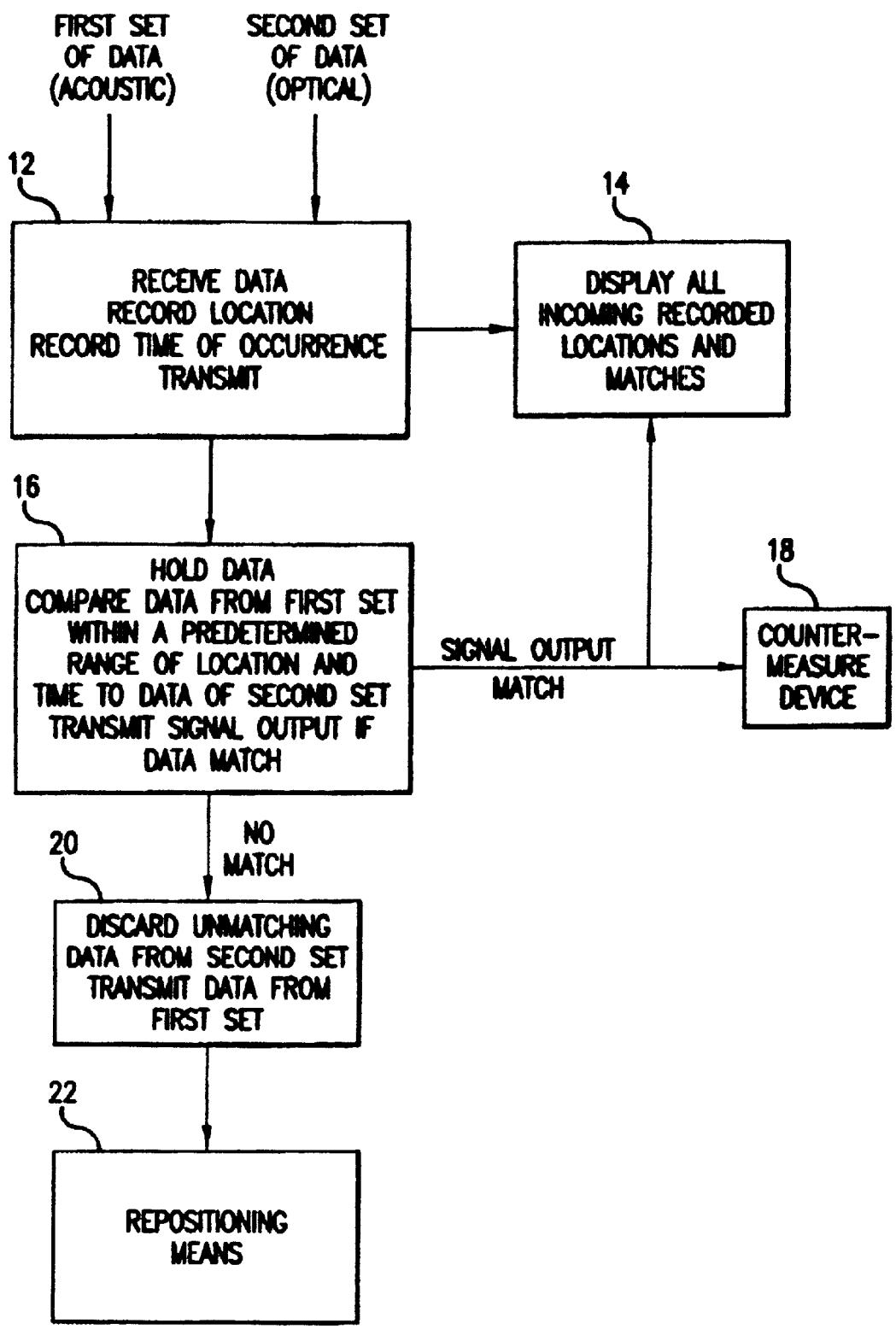
FIG. 2 is a block diagram of the operation of the processing means used in the preferred embodiment of the present invention.

To understand the operation of weapon localization system 2, reference is now made to FIG. 2 which illustrates the operation of the processing means 8 used in the preferred embodiment of the invention. It should be obvious to those skilled in the art that other types of operations are possible. In the preferred embodiment of the invention, processing means 8 is a microprocessor assembly acting under stored program control and which may substantially correspond to the previously described microprocessor assemblies 24 and 28. One example of an acceptable processor for use in these assemblies is a commercially available Pentium® type processor manufactured by Intel Corporation.

According to one aspect of the present invention, processing means 8 is communicatively and physically coupled to processing means 28 and 36 and receives first and second sets of data from acoustical detection system 24 and optical detection system 32, respectively. Processing means 8 records the location and time of occurrence of each set of data received and outputs the data to a display, as indicated by software operation blocks 12, 14. Processing means 8 holds and/or stores all locations from the second set of data for a predetermined period of time and compares these stored locations with locations from the first set of data, as indicated by block 16. A "match" or "hit" is indicated when a location and time from the first set of data (hereinafter referred to as the "acoustical event") fall within a predetermined range of a location and time from the second set of data (hereinafter referred to as the "optic event"). If a match is detected, processing means 8 will generate a signal output, as indicated by block 16. Indicating that both the acoustical and infrared systems "match" and correspond to a hostile weapons location. In the preferred embodiment of the invention, the signal output will be transmitted to a display, indicated by block 14, where it will be shown in a manner different from the displayed locations of unmatched data points. The signal output will also indicate whether the acoustical event occurred before the optically sensed event. When the acoustical event occurs before the optically sensed event, the optical event actually represents a subsequent attack from the same location, since optical energy generally reaches the observer before acoustical energy and the associated missile. In such a case, a counter-measure against the incoming missile may be launched. In the preferred embodiment of the invention, a counter-measure device, indicated by block 18, receives the signal output and is designed to position a weapon and fire a counter-attack at the predicted location of the missile and/or the missile's origin. Data such as azimuth, elevation/depression angle, arrival angle and trajectory of the incoming energy can be used to calculate the path of the missile and intercept it before arrival.

Figure 6:
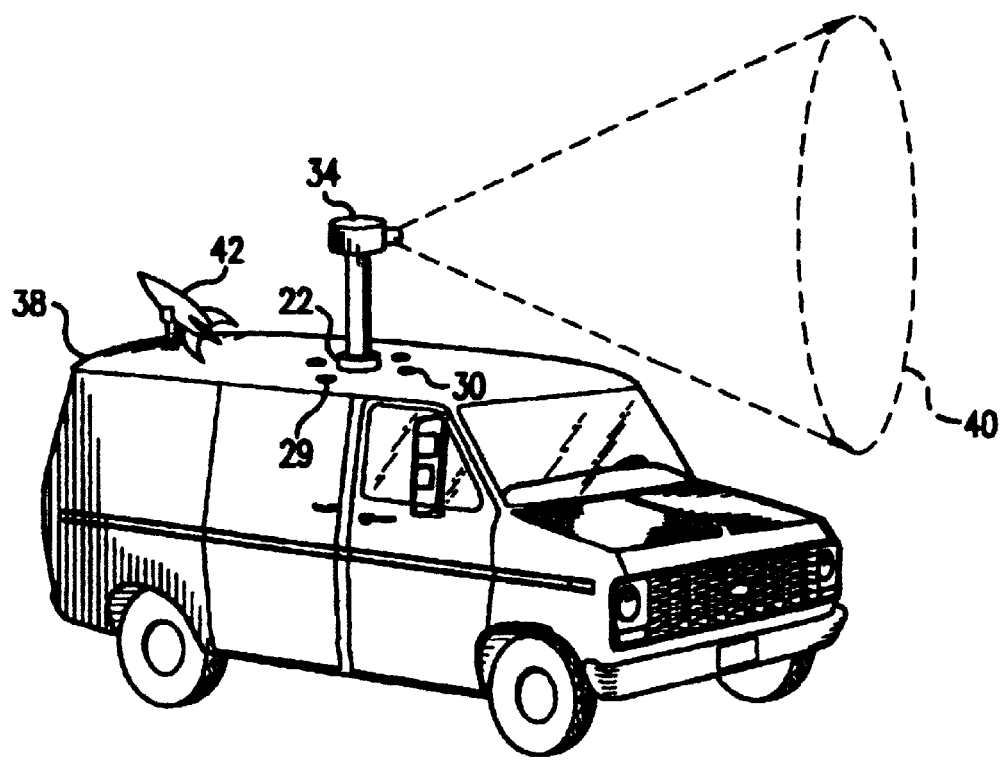
FIG. 6 is a perspective view of components of the preferred embodiment of the present invention employed on the exterior of a vehicle.

If no matches are detected within a predetermined period of time, the unmatching locational data from the optical event will be discarded, as indicated by block 20, and the unmatching data from the acoustical event will be transmitted to a repositioning means, as indicated by block 20, 22. As best shown in FIGS. 5 and 6, repositioning means 22 will rotate infrared camera 34 so the field of view 40 of infrared camera 34 is centered in the location of the acoustical event, thus ensuring a match in the event of subsequent fire from that location. In this manner, the infrared camera 34 is "keyed" to a specific area thereby reducing the false alarms and taking advantage of the relatively great accuracy of the optical detection means. In essence, the broad acoustical detection techniques and system is used to fix a rather coarse location and the optical detection system is used to further refine this detection.

To passively determine the range or distance to the hostile weapons fire, the invention uses a "flash-bang" analysis. In one embodiment, processing means 8 takes the second or optical data and notes the time of its arrival. Then, processing means 8 takes the first or acoustical data which arrives later than the optical data and note the time of this arrival. Then processing means 8 takes the difference between the two times (which is directly proportional to the range) and by a known mathematical algorithm determines the range. In one example, the difference is multiplied by the speed of sound and this value is used as the range.

Figure 7:
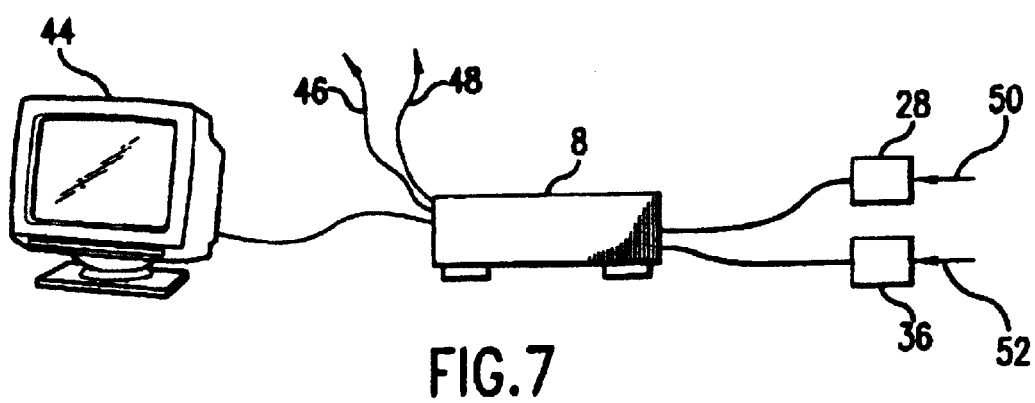
FIG. 7 is a side view of components of the preferred embodiment of the present invention employed within a vehicle.

Referring now to FIGS. 6 and 7 there is shown one exemplary type of embodiment of a hostile weapon location/detection system 2 made in accordance with the teachings of the invention arid, illustrated and described as used or employed in combination with countermeasure devices and/or apparatuses. Specifically, FIG. 6 illustrates the exterior of a military vehicle 38 with installed components of weapon localization system 2, including microphone array 30, infrared camera 34, repositioning means 22 and a counter-measure device 42. FIG. 7 illustrates the components residing in the interior of military vehicle 38, including processing means 8, acoustical processor 28, optic processor 36, display 44, output line 46 (leading to repositioning means 22), output line 48 (leading to counter-measure device 42), input line 50 (from microphone array 30), and input line 52 (from infrared camera 34).

Figure 8:
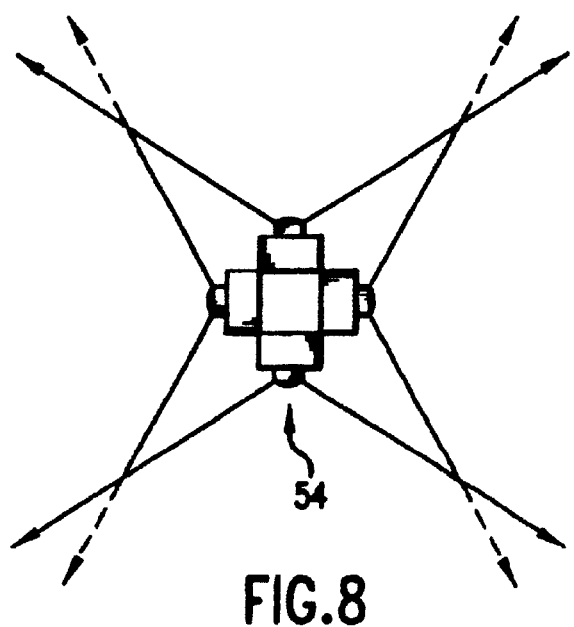
FIG. 8 is a top view of a camera array which may be used in the present invention.

Weapon location/detection system 2 may also function and/or operate with a camera array 54 (pictured alone in FIG. 8) replacing singular and/or substantially singular infrared camera 34. Camera array 54 is designed to have a cumulative field of view of about 360 degrees. In such case, repositioning means. 22 is not included in weapon localization system 2, nor is it required, since camera array 54 covers all possible fields of view. Other than the absence of repositioning means 22, weapon localization system 2 with camera array 54 operates in substantially the same manner as previously described.

Figure 9:
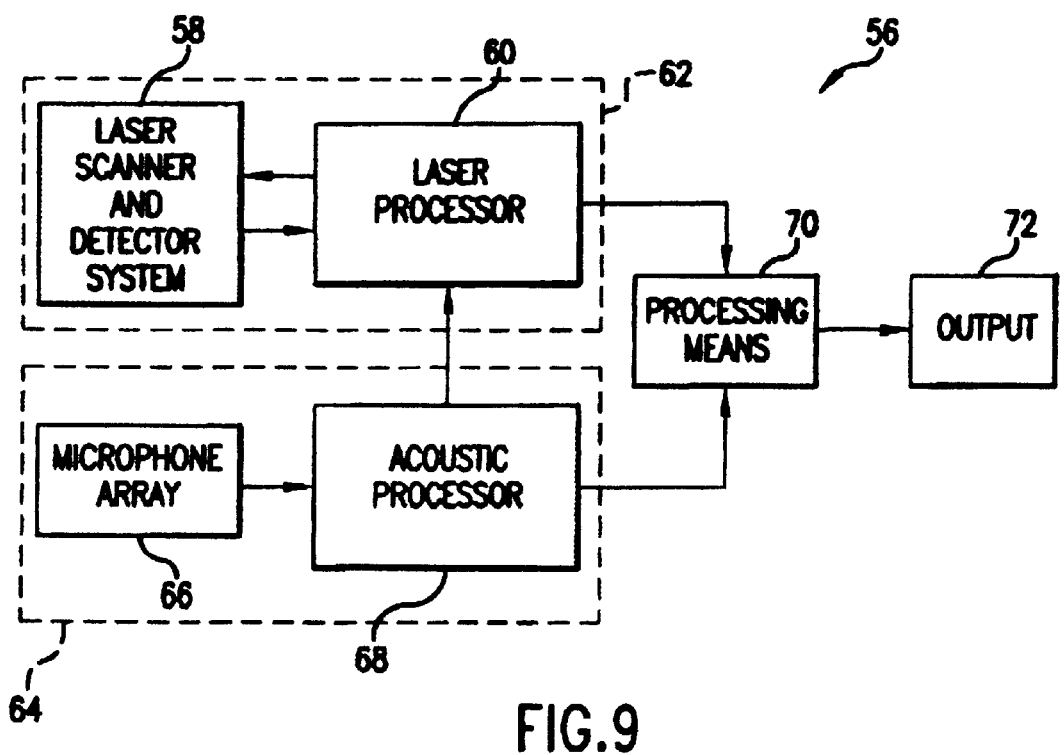
FIG. 9 is a block diagram of the operation of a second embodiment of the present invention.

Referring now to FIG. 9, there is shown a weapon location/detection system 56 which represents a second embodiment of the present invention. As shown, weapon localization system 56 includes an acoustical detection system 64, comprising an acoustical processor 68 (which may correspond or be substantially identical to the type of microprocessor assembly as assembly: 28), a microphone array 66; a laser detection system 62, comprising a laser processor and a laser scanner and detector system; a processing means 70 (which may correspond to the type of microprocessor assembly as assembly 28); and an output display means 72.

Acoustical detection system 64 may be a conventional and commercially available acoustical detection system substantially similar to previously described acoustical detection system 24. Acoustical detection system 64 operates in substantially the same manner as acoustical detection system 24 with the exception that instead of a single output transmission, acoustical processor 56 determines the location of the source of the acoustical energy and transmits a first set of data describing such location to processing means 70 and laser processor 60, as shown in FIG. 9. Weapon localization system 56 is not limited to use with acoustical detection system 64. The inventor realizes, as should one of ordinary skill in the art, that a number of other acoustical detection systems can be used that would produce substantially similar results and would not depart from the spirit and scope of the invention as, for example, delineated within the subjoined claims.

Laser detection system 62 may be a conventional and commercially available laser detection system, examples of which are more fully described in the article entitled "Laser Remote Sensing, Air Pollution," authored by Hun and published by the U.S. Department of Energy (hereby incorporated by reference as if fully and completely set forth herein, word for word and paragraph by paragraph) and sold by OCA Applied Optics (Garden Grove, Calif.) and Laser Technology, Inc. (Englewood, Colo.).

Figure 10:
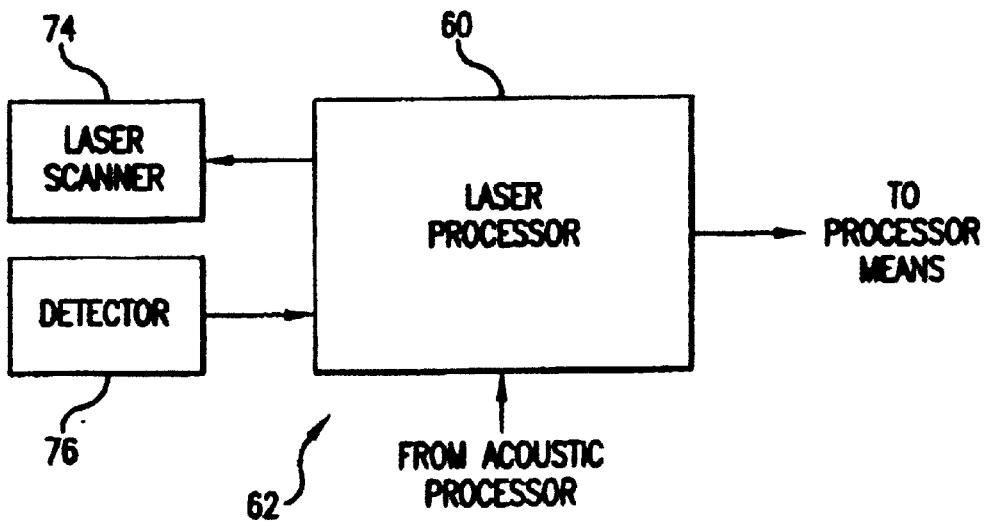
FIG. 10 is block diagram of a laser detection system used in the second embodiment of the present invention.

Specifically, laser detection system 62 comprises laser scanner and detector system 58 and laser processor 60. Laser processor 60 receives the first set of data from acoustical processor 68, determines the approximate direction to the missile trajectory and source and transmits this information to laser scanner and detector system 58. Referring now to FIG. 10, there is shown a block diagram representing laser detection system 62. Laser scanner 74 emits a laser beam which scans the area received from laser processor 60. Detector 76 detects the reflections occurring when the laser beam contacts particles, such as aerosols, which are emitted through discharge of a weapon and which are left in the trail of a missile's trajectory near the muzzle of the weapon. Detector 76 transmits a signal to laser processor 60 which determines the location of the source of the hostile weapon fire by either calculating the range and azimuth from particles at the point of discharge or extrapolating the detected trajectory to an estimated origin. Laser processor 60 then transmits a second set of data describing such location to processing means 70. Processing means 70 will determine values such as azimuth, range, and the trajectory path of the incoming missile. The precise operation and calculations of processing means 70, is more fully described in the aforementioned references. Weapon localization system 56 is not limited to use with the aforementioned laser detection system. Furthermore, inventor realizes, as should one of ordinary skill in the art, that a number of other laser detection systems can be used that would produce substantially similar results and not depart from the spirit of the invention.

Figure 11:
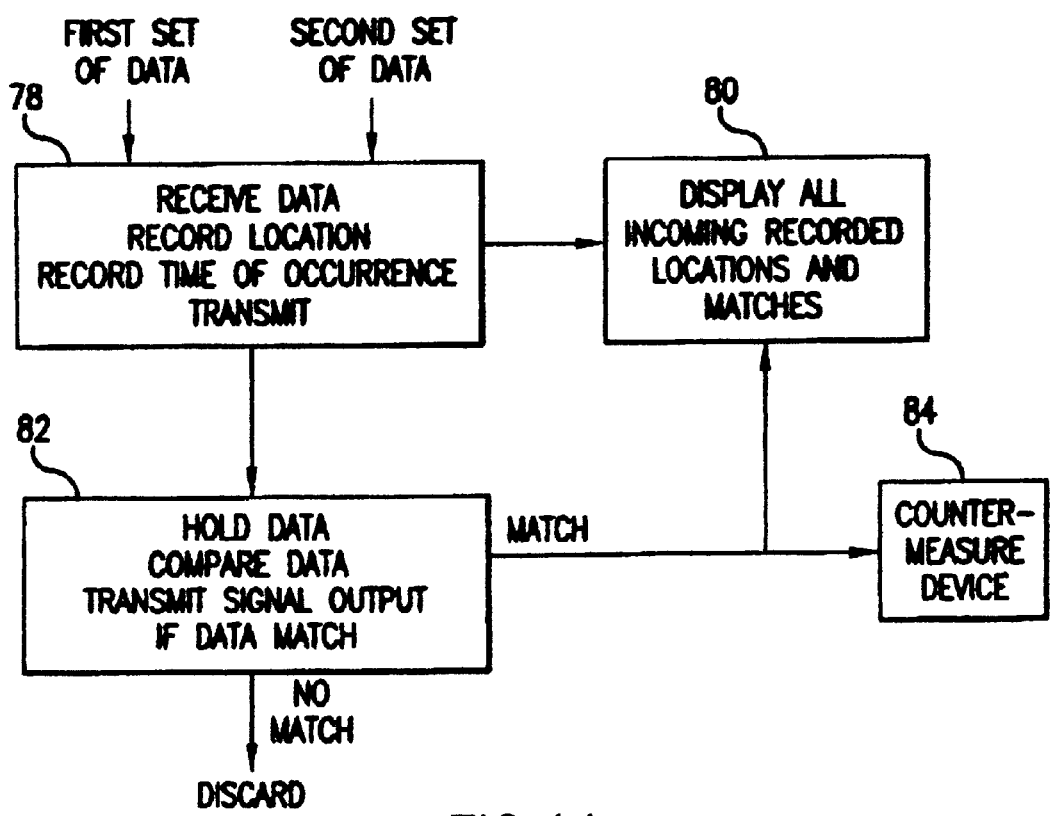
FIG. 11 is a block diagram of the operation of the processing means used in the a second embodiment of the present invention.

To understand the operation of weapon localization system 56, reference is now made to FIG. 11 which illustrates the operation of the processing means 70 used in the preferred embodiment of the invention. In the preferred embodiment of the invention, processing means 70 is a digital or analog or combined digital and analog signal processor or a microprocessor acting under stored program control. Processing means 70 will receive first and second sets of data from acoustical detection system 64 and laser detection system 62. Processing means 70 will then record the locations and time of occurrence of each set of data received and output the data to a display, as indicated by blocks 78, 80. Processing means 70 will then hold all locations from the first set of data for a predetermined period of time and compare with locations from the second set of data, as indicated by block 82. A match will be indicated when location and time from the first set of data (hereinafter referred to as the "acoustical event") and the second set of data (hereinafter referred to as the "laser event") fall within a predetermined ranges of each other. If a match is not detected within a predetermined period of time, the unmatching data will be discarded. If a match is detected, processing means 70 will generate a signal output, as indicated by block 82. In the preferred embodiment of the invention, the signal output will be transmitted to a display, indicated by block 80, where it will be shown in a manner different from the displayed locations of unmatched data points. In the preferred embodiment of the invention, a counter-measure device, indicated by block 84, receives the signal output and is designed to position a weapon and fire a counter-attack at the predicted location of the missile's origin.

Figure 12:
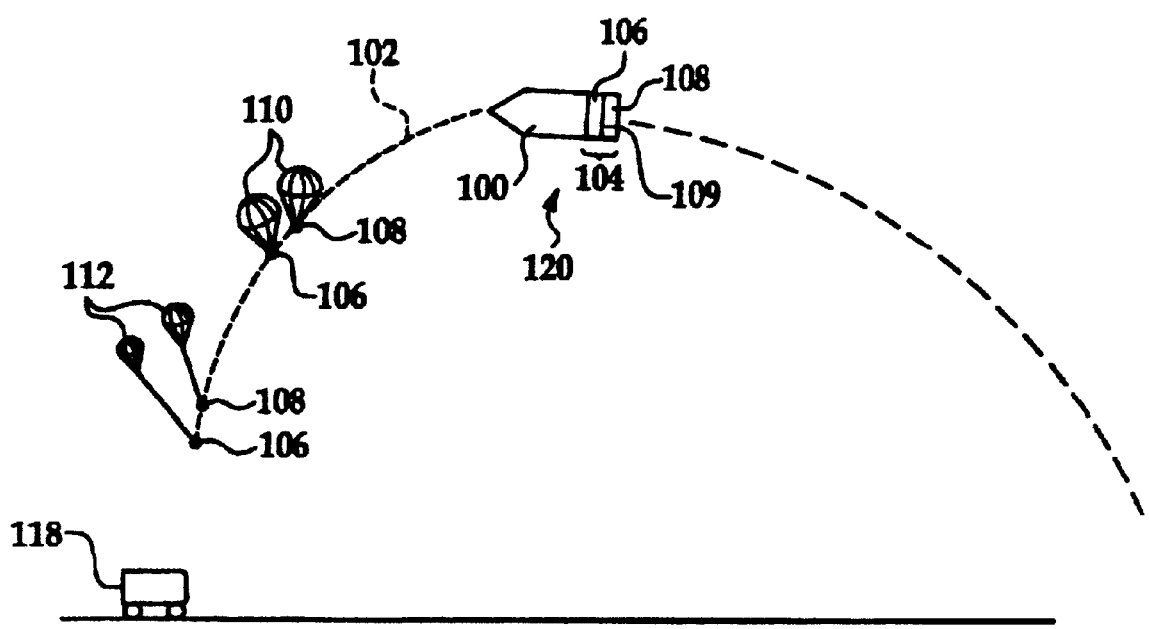
FIG. 12 illustrates the trajectory of a typical top attack weapon and the main, and first and second band cutting events.
Figure 13:
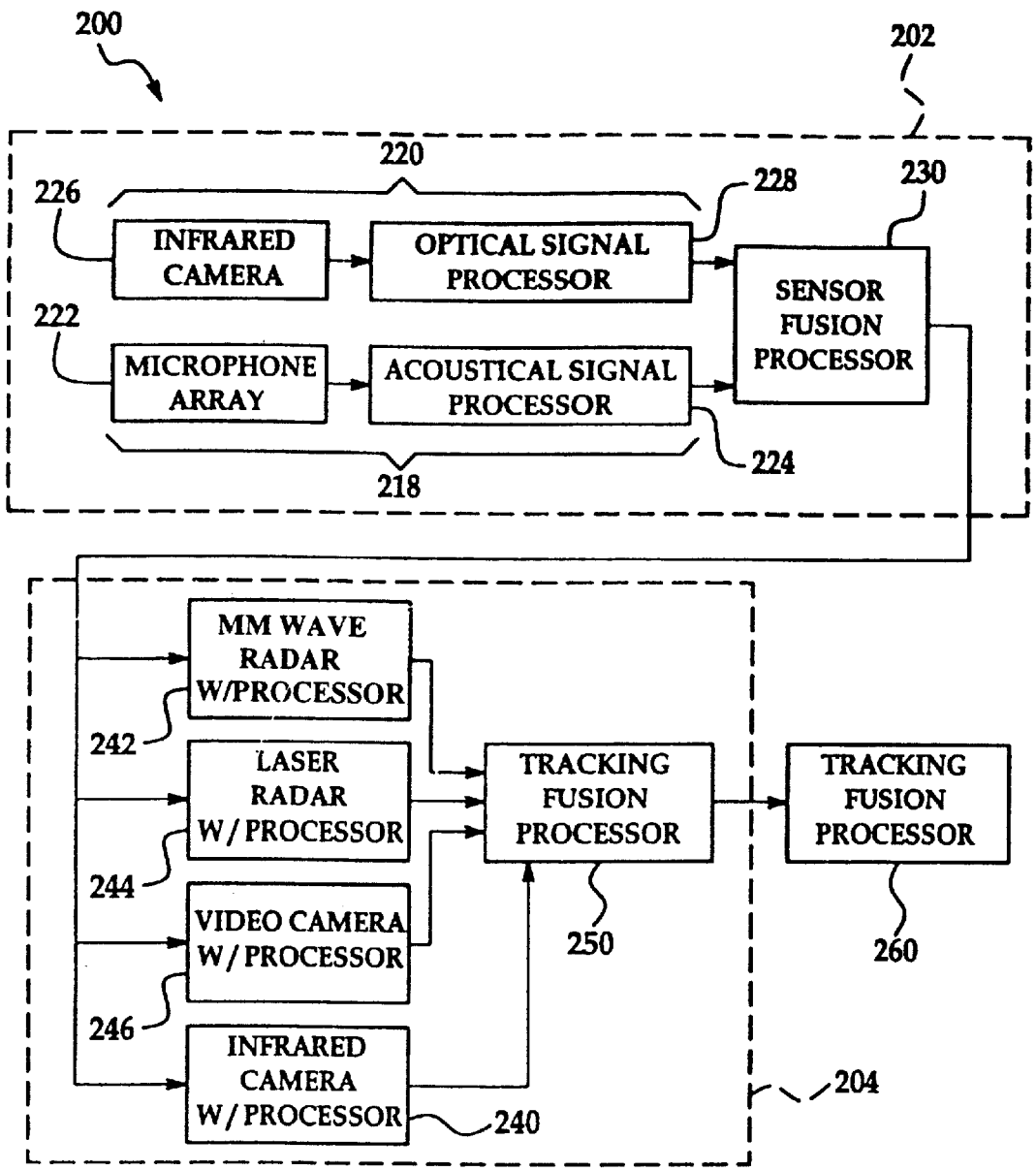
FIG. 13 is a block diagram of a preferred embodiment of a top attack, detection and tracking system.

Referring now to FIG. 13, there is shown a block diagram of another embodiment or "system" of the present invention. Particularly, as shown in FIG. 13, a, top attack detection, tracking and countermeasure system 200 may be developed according to the principles of Applicant's invention which is especially suited to detect, locate and direct countermeasures against overhead or "top attack" weapons which have been previously described herein and illustrated in FIG. 12. The system 200 consists of a detection subsystem 202, which detects the expulsion of the two submunitions 106, 108, an active tracking subsystem 204, which tracks the trajectory of the submunitions 106, 108 as they fall, and a countermeasure subsystem 216 which, in one embodiment, is adapted to direct and control the operation of certain countermeasure devices effective to destroy the "incoming submunitions" and to protect the targeted vehicle and personnel. The system 200 operates by first detecting and locating the highest altitude event, (i.e., the "main event", or the event occurring at the highest point of the weapon's trajectory or path) by use of the acoustical detection and location system 218 and the optical, detection and location system 220, which collectively sense the acoustical and/or infrared signals associated with the main event and/or band-cutting events. The processing functions and algorithms contained in the above-cited patent references and publications and as previously explained are used by the system 200 to determine the direction of the main event and altitude and range of the main event in respect to the vehicle. That information is then used to "cue" and/or control a tracking subsystem 204 that follows the weapon through its attack trajectory and facilitates launching a countermeasure via countermeasure subsystem 216.

The detection and localization subsystem 202 is comprised of a passive imaging infrared detection device (i.e., optical subsystem 220), a passive acoustical detection device (i.e., acoustical subsystem 218) along with a sensor fusion processor 230. While a combination of acoustical and optical systems is preferable, it should be understood that either one of these technologies (i.e., acoustical or optical) could be used individually as the single detection technology in this invention, but with somewhat reduced capability and/or precision. In the preferred embodiment of system 200, detection subsystem 202 comprises the combination and fusion of a passive acoustical detection and location system 218 and an infrared.(e.g., mid-wave (3–5 micron)) detection and location system 220. Acoustical detection and location system 218 comprises a microphone array 222 and an acoustical signal processor 224. Infrared detection and location system 220 comprises one or more infrared cameras 226, which in this embodiment of the present invention are positioned at an "elevated" angle (e.g., approximately 45 to 90 degrees) from the horizontal in order to detect the main and/or band cutting events, and an optical signal processor 228. In one embodiment of the invention, each of the cameras 226 comprises substantially identical commercially available cameras such as an infrared microbolometer sold by the Loral Corporation (Boston, Mass.), or the model IRC-160ST Staring Mid Wavelength Infrared Camera, manufactured and 'sold by Cincinnati Electronics (Cincinnati, Ohio). Sensor fusion processor 230 is substantially similar in function and structure as previously described processing means 70. As previously described herein, the dual technology approach exploits the fact that the advantages of one technology are the disadvantages of the other so that by using sensor fusion processing a greatly improved capability and precision is obtained.

An important feature of the detection and location subsystem 202 of this invention is that elevation angle and pattern recognition is applied to both the optical signals and the acoustic signals received by acoustical detection and location system 218 and optical detection and location system 220. In such a manner, detection and location subsystem 202 provides a means for recognizing and distinguishing the main event and first and second "band cutting" events of the overhead weapon 100, from other ground based weapon attacks and noise. More particularly, in system 200 both the acoustical detection and location system 218 and the optical detection and location system 220 are able to discriminate against transient acoustic and infrared events associated with ground based weapons on the basis of elevation angle. A hostile "top attack" weapon would have an elevation angle in the order of 60 degrees or more while most other battlefield events and noise would have much lower elevation angles. Thus, when the acoustical detection and location system 218 detects an elevation angle in the order of 60 degrees or greater, sensor fusion processor 230 will activate the tracking subsystem 210. Likewise, when the optical system 220 detects an optical signal at an elevation angle in the order of 60 degrees or greater, sensor fusion processor 230 will trigger the tracking subsystem 204. Sensor fusion processor 230 may also be programmed to trigger tracking subsystem 204 only upon the detection of a 60 degree or greater elevation angle from both the acoustical detection system 218 and the optical detection system 220. Triggering of the tracking subsystem 204 could also be made further conditional upon receipt of a signal which meets predetermined pattern recognition requirements associated with a "main event" and/or "band cutting" events.

Pursuant to the equations and methods described in the above-referenced patent references and publications, the acoustical detection and location system 218 uses the data received by the microphone array 222 to calculate the azimuth, angle of elevation, and range of the acoustical signal. The range to the source can also be determined passively using the previously described technique of "flash-bang" processing, where the time delay between detection of the flash and detection of the sound is used to effect the range calculation.

The microphone array 222 is designed to be acoustically semitransparent to allow omnidirectional response for the acoustical hemisphere above the ground. Therefore, for a given signal-to-noise ratio there is an approximately equal probability of detection of transient signals arriving from any direction. For this application, pattern recognition will be optimized for the main event and/or-band cutting events, but will retain a capability to detect small arms and vehicle mounted weapons as well. This technique has been shown experimentally to be capable of localizing signals generated by all of these sources.

The assumed worst case scenario for the application of acoustical detection subsystem 218 overhead weapon detection system, is detection from a moving vehicle such as a tank, a cargo truck or a universal utility vehicle (e.g., the "HUM-V"). The dominant noise for a typical vehicle mounted system is the engine noise assuming proper attention to aerodynamic design to minimize flow noise effects. Results of signature measurements for such vehicles show that a significant amount of the engine and machinery noise can be attenuated by a high pass filter that greatly decreases the amplitude of the noise without compromising the signal amplitude. It should be understood that the acoustical subsystem 218 includes a high pass filter.

Fundamental detection theory has shown that the optimum signal detection is accomplished using a matched filter. A conventional matched filter design distinguishes between the background noise and the specific signal characteristics. In the present invention, the matched filter for this system will be optimized for the main event and/or the band cutting events. It should be understood that acoustical subsystem 218 further includes a matched filter.

In the preferred embodiment of the invention, the optical subsystem 220 is sensitive to flashes in the midwave infrared band (3–5 nanometer wavelength). Optical subsystem 220 includes an imaging device or devices, (i.e., camera 226) that produces a video signal that is analyzed by optical signal processor 228 to determine the position of the detected signal within the field of view. This field of view information is used with camera position and elevation angle information to relate the position of a detected flash to a three dimensional frame of reference.

In combination, the acoustical system 218 provides weapon position information that allows the sensor fusion processor 230 to distinguish the flash of the main event and/or the band cutting events from other false flashes. Using the previously described sensor fusion processing, the optical/infrared system 220 provides high accuracy for localization while the acoustical system 218 allows for omnidirectional coverage with somewhat less accuracy and eliminates false alarms common to the infrared system. For ambient light conditions where optical contrast is low and optical detection capability is limited, or for conditions of reduced visibility such as low cloud cover, the presence of tactical smoke, and/or tactical overhead cover, the acoustical system 218 alone can provide sufficient accuracy for effectively detecting, locating and countering overhead weapon attacks.

The detection and location subsystem 202 is used to cue a tracking subsystem 204. Tracking subsystem 204 utilizes one or more tracking technologies such as (a) a passive visual subsystem (video camera) 246 using image tracking processing (one example of such a camera is model number CCD-TRV715 manufactured by Sony), (; (b) a millimeter (mm) wave radar subsystem 242 with and electronically and/or mechanically steered antenna (one example of such a millimeter wave radar system is described in Suomela, J., Kuusela, J., and Halme, A. "Millimeter wave radar for close terrain mapping of an intelligent autonomous vehicle," $2^{nd}$ IFAC Conference on Intelligent Autonomous Vehicles Helsinki, Finland (1995), pp. 349–354, which is fully and completed incorporated herein by reference); (c) a laser radar (e.g., "LADAR", "LIDAR", "CLR", "NLR") subsystem 244, (examples of such systems are the laser radar systems which have been developed and/or are currently in development by the United States Air Force Wright Laboratory, Loral Vought Systems, and the LADAR Development and Evaluation Research Facility, and those systems described in J. W. Grantham, E. C. Meidunas, "Laser Radar in adverse weather," SPIE Aerosense Conference 3380, Laser Radar Technology and Applications III (1998); E. A. Wachter, W. G. Fisher, "Coherent burst laser ranging," SPIE Aerosense Conference 3380, Laser Radar Technology and Applications III (1998); J. T. Sackos, R. O. Nellums, S. Lebien, J. W. Grantham, T. C. Monson, "Low-cost high resolution video-rate imaging optical radar," SPIE Aerosense Conference 3380, Laser Radar Technology and Applications III (1998); H. N. Burns, S. T. Yun, K. M. Dinndorf, D. R. Hayden, "Compact multichannel receiver using InGaAs APDs for single-pulse eye-safe laser radar imagery," Laser Radar Technology and Applications III (1998); W. J. Mandeville, K. M. Dinndorf, N. E. Champigny, "Characterization of passively Q-switched microchip lasers for laser radar," SPIE Vol. 2748, p. 358–366, Laser Radar Technology and Applications, Gary W. Kamerman, Ed. (June 1996); and J. R. Brandt, T. D. Steiner, W. J. Mandeville, K. M. Dinndorf, N. J. Krasutsky, J. L. Minor, "Long-range imaging ladar flight test," SPIE Vol. 2742, p. 114–117, Applied Laser Radar Technology II, Gary W. Kamerman, Ed. (June 1995) all of which are fully and completely incorporated herein by reference)); and/or (d) a mid-wave imaging infrared subsystem 240 with image tracking processing, (examples of such systems include the infrared microbolometer sold by the Loral Corporation (Boston, Mass.); model IRC160ST Staring Mid Wavelength Infrared Camera, manufactured and sold by Cincinnati Electronics (Cincinnati, Ohio); or any of the models in the AGEMA 500 series sold by FLIR Systems, Inc.). It should be understood that in a more cost effective embodiment, infrared camera 226 and optical signal processor 228 could perform tracking functions as well as detection functions, thereby replacing and eliminating the need, for infrared subsystem 240. In such case, sensor fusion processor 230 would send cueing information back to optical signal processor 228 and infrared camera 226, and optical signal processor 228 would then communicate tracking information directly to tracking fusion processor 250. All of the above-listed tracking technologies are commercially available and well-known in the art.

The detection subsystem 202 provides acquisition information to the tracking system 204. The individual results of tracking subsystems 240, 242, 244 and 246 are processed by a tracking fusion processor 250, which in one embodiment of the invention may be substantially similar to processor 70, which calculates the "cueing" information for the countermeasure. Data such as the time elapsed since the main event and/or band cutting events, azimuth, elevation/depression angle, arrival angle and trajectory of the incoming energy can be used to calculate the path of the submunitions 106, 108. In this manner, tracking fusion processor 250 can predict where the location of submunitions 106, 108 will be located at some predetermined future time, and cue countermeasure device 260 to intercept, disable and/or destroy the submunitions 106, 108 before they have an opportunity to fire upon the vehicle. Importantly, using the above-listed data, tracking fusion processor 260 will be able to determine the most effective countermeasure(s) to employ given the time available and the relative position of submunitions 106, 108.

Countermeasure device 260 can employ a variety of conventionally known countermeasures such as conventional "heat seeking" missiles (e.g., "patriot" missiles) designed to intercept submunitions 106, 108 and destroy them before they are able to fire an attack upon the targeted vehicle. Countermeasure device 260 could also deploy tactical smoke or other conventional concealing means to hide the target vehicle from the scanning submunitions 106, 108. One countermeasure device especially suited for this application is a directed energy laser which is cued by the tracking subsystem 204. One example of a suitable directed energy laser system is the Tactical High Energy Laser (THEL) Defense System developed by TRW Inc. This directed energy laser is cued in the direction of a RAID or VRP and is used to cut the fabric of either device. In this manner, the submunition's timing and arming sequences are disrupted. When the RAID or VRP is severed, the speed and trajectory of the subminitions will change, causing the weapons to fall harmlessly to the ground before their arming sequence can be completed. A directed energy laser could also be used to directly destroy, submunitions 106, 108.

Figure 14:
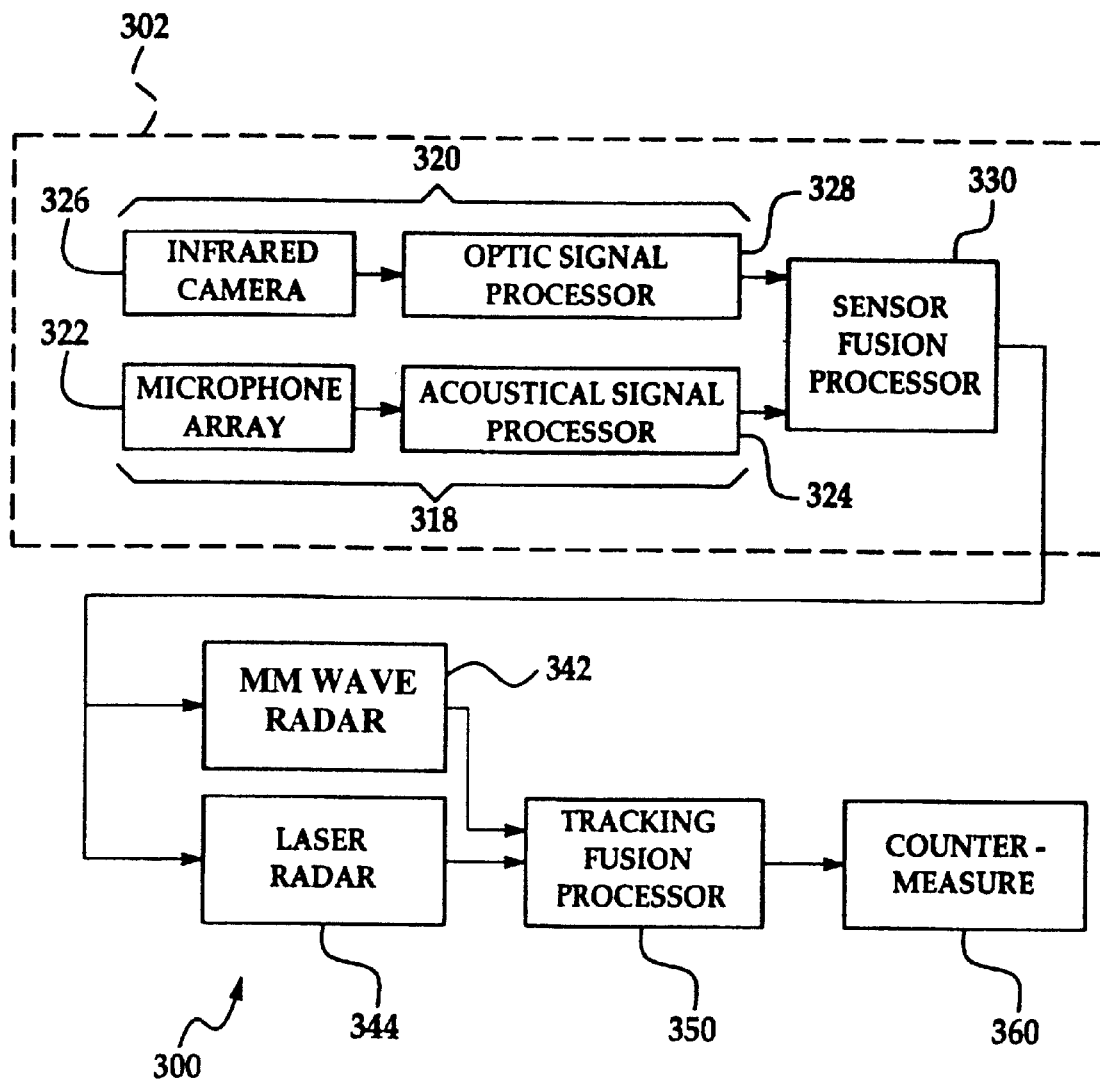
FIG. 14 is a block diagram of a second embodiment of a top attack detection and tracking system.
Figure 15:
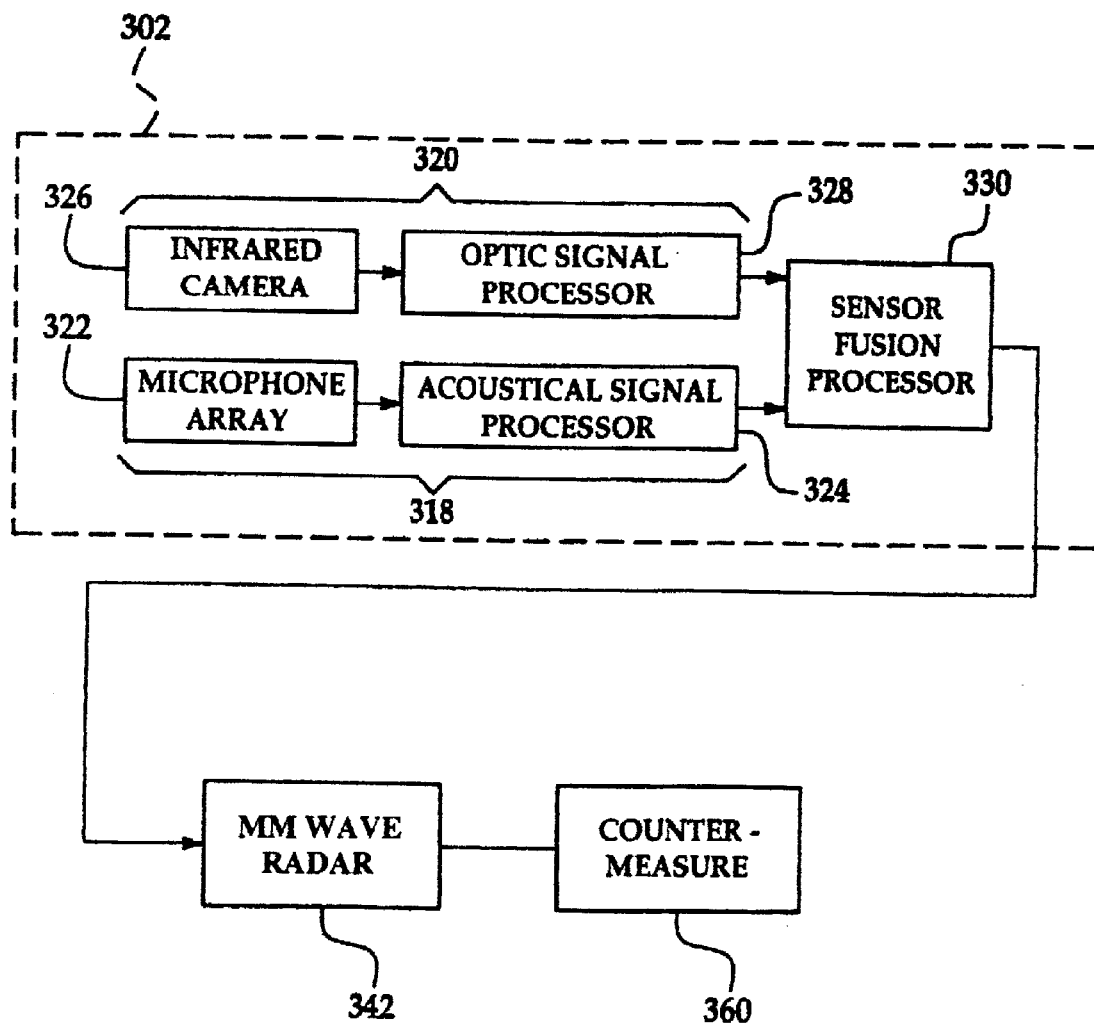
FIG. 15 is a block diagram of a third embodiment of a top attack detection and tracking system.

While in the preferred embodiment of the invention, all four tracking subsystems are utilized, the complete detection, tracking and countermeasure activation sequence can use different combinations of these technologies. For example and without limitation, decreased cost configurations with substantially similar capabilities are available using only selected tracking technologies. An example is shown by the block diagram in FIG. 14. Here the detection subsystem 302 comprises an infrared subsystem 320, which is substantially similar to infrared subsystem 220, and an acoustical subsystem 318, which is substantially similar to acoustic subsystem 218. Detection subsystem 302 is in communication with a sensor fusion processor 330, which is substantially similar to sensor fusion processor 230 and delivers an output signal to the tracking subsystem. Tracking is accomplished by the fusion of a millimeter wave radar subsystem 342 and a laser radar tracking subsystem 344 via tracking fusion processor 350, which is substantially similar to tracking fusion processor 250. Tracking fusion processor 350 "cues" countermeasure device 360 which is substantially similar in function and structure as countermeasure device 260. Similarly, in another embodiment, illustrated in FIG. 15, having only slightly less performance but greater ease of implementation, tracking can be performed by using only millimeter wave radar subsystem 342. Such an approach would eliminate the need for both laser radar tracking subsystem 344 and tracking fusion processor 350. Similarly, in the embodiment illustrated in FIG. 15, millimeter wave radar subsystem 342 could be replaced with laser radar tracking subsystem 344.

In summary, a wide variety of configurations are possible within the spirit and the scope of this invention. Either detection technology alone could be used with any combination of one, two, three or all four tracking technology subsystems. In such an instance, the detection technology would provide acquisition information to the tracking technology or technologies. When two or more tracking technology subsystems ate used, their results would be processed by a tracking fusion processor. This processor would not be necessary for any configuration using a single tracking subsystem. Also included in the spirit of this invention is the use of two or more devices to form a single technology subsystem. An example would be using two or more infrared sensors that are sensitive to two different wavelength signals. Another example would be using two or more lasers with different wavelengths for threat weapon tracking.

Recent research has shown that the firing of various weapons ranging from pistols to cannons causes a burst of radio frequency energy. Also, it is likely that the initial expulsion of a SADARM top-attack weapon emits a similar signal since similar explosive events exhibit such energy. It is the purpose of this disclosure to add the capability to detect such radio frequency energy to the previously disclosed Acousto-optic detection system.

For artillery and small arms detection, the added capability will provide an additional means to confirm the coincidence of weapon firing with optical events and a means to confirm top attack expulsion events. Further, it will provide a means to determine the specific weapon by measuring the frequency of the pulse since frequency is specific to the class of weapon. This added capability will enhance the capability of all of the embodiments of the acousto-optic detection system invention as previously patented.

Figure 16:
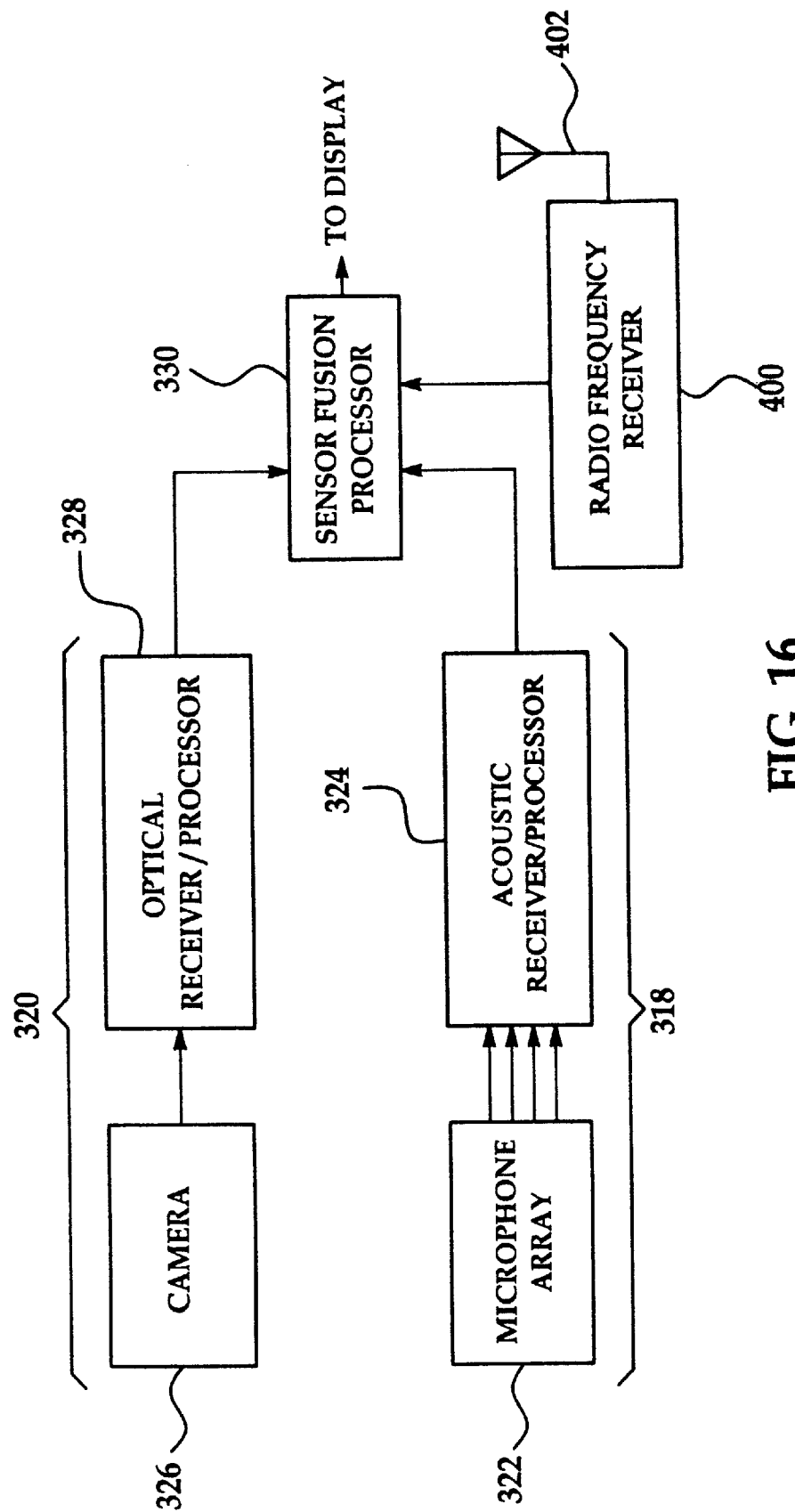
FIG. 16 is a block diagram of a fourth embodiment of a top attack detection and tracking system.

As shown in FIG. 16, this invention includes an antenna 402 capable of receiving radio frequency energy and adds a specific radio frequency receiver input 400 to the sensor fusion processor 330 of the combined optical and acoustical detection and location technologies 320, 318 that localize the source of hostile weapon fire as previously described. As with the previous configuration, the advantages of one technology are the disadvantages of the other so that by using sensor fusion processing a greatly improved capability is obtained. The technique is applicable to localizing the source of any direct fire weapon that has two or more of the following signature: optical, acoustic, and/or radio frequency burst. Non-limiting examples of such weapons include small arms, short range missiles, rockets, small caliber mortars, and large artillery. An added advantage is "flash-bang" processing in that the difference between the time of occurrence of the flash and the time of arrival of the acoustic signal can be measured to determine the range to the hostile fire location by exclusively passive means.

Various embodiments of uncooled microbolometer imaging infrared cameras are also claimed for this invention. A microbolometer comprises an array of a resistive material that has a specific electrical resistance of a specific value for the dark condition or not receiving infrared radiation. When receiving infrared radiation, commonly in the 3–5 micron band or in the 8–14 micron band, the resistance of the individual elements in the array changes in a manner corresponding to the amount of radiation received. Such a camera would be a significant enhancement to the invention as previously described and as modified here. Specific designs include the LTC 500 and its imaging module and the SIM200 as currently marketed by BAE Systems, previously Lockheed Martin and Sanders Associates, a Lockheed Martin Corporation.

A second infrared camera claimed with this invention is an uncooled infrared detector based upon bandgap detection and described in U.S. Pat. 6,114,696 and a third is the uncooled infrared bandgap detector described in U.S. Pat. 6,100,525, both assigned to the Lockheed Martin Corporation. Such a camera would be a significant enhancement to all of the basic embodiments of the acousto-optic detection system invention that include an infrared camera.

The two bandgap detector devices are described as follows. An infrared radiation detection device that comprises a dipole antenna mounted on a substrate and connected through blocking contacts to a bandgap detector element. The dipole antenna has a length which is approximately one half the wavelength of the incident infrared radiation. The bandgap detector element has linear dimensions which are each substantially smaller than the wavelength of the detected radiation. A group of detector devices are combined to form an array which can produce a device that is capable of producing a usable output signal without the need for cooling below ambient temperature. Such an array forms the sensing element from imaging an infrared source such as the flash of a rifle, machine gun, SADARM expulsion or and artillery weapon.

Another possible embodiment is to use a single directional microphone of various constructions to be used to find the approximate direction to the source of hostile weapon fire. While not as accurate as the previously described, multiple microphone array formed from omnidirectional microphones, this means can be used to confirm direction as determined by an optical or electro-optical (laser) detection sensor as was described previously.

It is to be understood that the invention is not limited to the exact construction or method illustrated and described above, but that various changes and modifications may be made without departing from the spirit and scope of the invention as defined in the following claims. Moreover, it should be realized that Applicant's weapon location system invention is superior to those of the prior art in that Applicant has combined two dissimilar types of weapons location systems in order to produce a system providing highly superior results which has hereto before not been obtainable.

What is claimed is:

1. A weapon localization system adapted to determine the location of weapon fire, said system comprising:

acoustical detection and direction sensing means for detecting energy of a first frequency originating from said weapon fire, and for transmitting a first set of data describing direction to said weapon fire and time of detection of said energy of a first frequency; and optical detection and direction sensing means for detecting and sensing direction to energy of a second frequency originating from said weapon fire, and for transmitting a second set of data describing said direction to said weapon fire and time of detection of said energy of a second frequency; and radio frequency detection means for detecting energy of a third frequency originating from said weapon fire, and for transmitting a third set of data describing said time of detection of said energy of a third frequency; and a first processing means coupled to said acoustical detection and direction sensing means, and said optical detection and direction sensing means, for receiving said first set of data, and said second set of data, and for determining whether said direction described by said first set of data match said direction described by said second set of data and for generating a signal output if said match occurs; and a second processing means coupled to said optical detection and direction sensing means, and said radio frequency detection means, for receiving said second set of data and said third set of data, and for determining whether said time of detection described by said second set of data match said time of detection described by said third set of data and for generating a signal output if said match occurs.

2. The weapon localization system of claim 1 wherein said acoustical detection and direction sensing means comprises an array of one or more directional microphones.

3. The weapon localization system of claim 1 wherein said acoustical detection and direction sensing means comprises an array of one or more non-directional microphones.

4. The weapon localization system of claim 1 wherein said optical detection and direction sensing means comprises an infrared imaging camera.

5. The weapon localization system of claim 4 wherein said infrared imaging camera comprises an uncooled microbolometer.

6. The weapon localization system of claim 4 wherein said infrared imaging camera comprises an uncooled infrared imaging bandgap detector camera.

7. The weapon localization system of claim 4 wherein said infrared imaging camera comprises a quantum well infrared imaging camera.

8. The weapon localization system of claim 1 wherein said radio frequency detection means comprises a radio receiver.

9. The weapon localization system of claim 1 wherein said radio frequency detection means comprises a spectrum analyzer.

10. A method for determining the distance from the weapon localization system of claim 1 to location of said weapon fire were the initial direction to said weapon is unknown, said method comprising the steps of:

(a) Sensing optical energy generated from said weapon fire;

(b) Sensing acoustical energy generated from said weapon fire;

(c) Determining a first time at which said optical energy was sensed;

(d) Determining a second time at which said acoustical energy was sensed;

(e) Determining a difference between said first and said second times; and (f) Calculating said range by use of difference between said first and said second times.

11. A method for determining the distance from the weapon localization system of claim 1 to location of said weapon fire were the initial direction to said weapon is unknown, said method comprising the steps of:

(a) Sensing radio frequency energy generated from said weapon fire;
(b) Sensing acoustical energy generated from said weapon fire;
(c) Determining a first time at which said radio frequency energy was sensed;
(d) Determining a second time at which said acoustical energy was sensed;
(e) Determining a difference between said first and said second times; and
(f) Calculating said range by use of difference between said first and said second times.

12. The weapon localization system of claim 1 wherein said optical detection and direction sensing means comprises optical imaging transducer means and optical reflection means that are fixed in relative physical positions such that said energy of a second frequency originating from said weapon fire and incident on said optical reflection means from any horizontal direction and any elevation angle between 90 degrees above a horizontal plane and 10 degrees below said horizontal plane is sensed by said optical imaging transducer means and forms an image on said optical imaging transducer means at a location that uniquely corresponds to the direction to said weapon fire; and a third processing means coupled to said optical imaging transducer means adapted to receive a fourth set of data from said optical imaging transducer means and determine direction to said weapon fire and for transmitting a fifth set of data describing said time of detection of said energy of a second frequency and said direction to said weapon fire.

13. The weapon localization system of claim 12 wherein said optical reflection means comprises a reflector with the shape of a cone.

14. The weapon localization system of claim 12 wherein said optical reflection means comprises a reflector with the shape of a hyperboloid.

15. The weapon localization system of claim 1 wherein said optical detection and direction sensing means comprises optical imaging transducer means and an optical refraction means that are fixed in relative physical positions such that said energy of a second frequency originating from said weapon fire and incident on said optical refraction means from any horizontal direction and any elevation angle between 90 degrees above a horizontal plane and 10 degrees below said horizontal plane is sensed by said optical imaging transducer means and forms an image on said optical imaging transducer means at a location that uniquely corresponds to the direction to said weapon fire; and a fourth processing means coupled to said optical imaging transducer means adapted to receive a sixth set of data from said optical imaging transducer means and determine direction to said weapon fire and for transmitting a seventh set of data describing said direction to said weapon fire and time of detection of said energy of a second frequency.

16. The weapon localization system of claim 1 wherein said optical refraction means comprises a wide angle lens.

17. The weapon localization system of claim 12 wherein said optical refraction means comprises a reflector with the shape of a paraboloid.

18. The weapon localization system of claim 12 wherein said optical optical imaging transducer means comprises an ultraviolet imaging camera.

19. The weapon localization system of claim 12 wherein said optical imaging transducer means comprises an infrared imaging camera.

20. The weapon localization system of claim 12 wherein said optical imaging transducer means comprises a visual imaging camera.

21. The weapon localization system of claim 1 wherein said weapon localization system comprises a top attack localization system.

22. The weapon localization system of claim 1 wherein said weapon localization system comprises a sniper localization system.

23. A weapon localization system as in claim 1 comprising an acoustic receiver; an optical receiver; a radio frequency receiver; a processor coupled to each of said receivers; and an information display.

24. A weapon localization system as in claim 1 comprising one or more acoustic receivers; one or more optical receivers; one or more radio frequency receivers; a processor coupled to each of said receivers; and an information display.

25. A weapon localization system as in claim 1 comprising an acoustic receiver; one or more optical receivers; a processor coupled to each of said receivers; and an information display.

26. A weapon localization system as in claim 1 comprising one or more acoustic receivers; one or more radio frequency receivers; a processor coupled to each of said receivers; and an information display.

27. A weapon localization system as in claim 1 comprising one or more optical receivers; one or more radio frequency receivers; a processor coupled to each of said receivers; and an information display.

28. A weapon localization system as in claim 1 comprising one or more optical receivers; one or more radio frequency receivers; a processor coupled to each of said receivers; and an information display.

* * * * *